(12) United States Patent
Voit et al.

(10) Patent No.: US 10,938,671 B2
(45) Date of Patent: Mar. 2, 2021

(54) MAPPING SERVICE CAPABILITIES

(71) Applicant: Cisco Technology, Inc., San Jose, CA (US)

(72) Inventors: Eric Voit, Bethesda, MD (US); Einar Nilsen-Nygaard, Kilmarnock (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 16/162,636

(22) Filed: Oct. 17, 2018

(65) Prior Publication Data

US 2020/0127899 A1    Apr. 23, 2020

(51) Int. Cl.
*H04L 12/24*    (2006.01)
*H04L 12/911*    (2013.01)

(52) U.S. Cl.
CPC ............ *H04L 41/50* (2013.01); *H04L 47/82* (2013.01)

(58) Field of Classification Search
CPC ............................... H04L 47/82; H04L 41/50
USPC ........................................................ 709/226
See application file for complete search history.

(56) References Cited

U.S. PATENT DOCUMENTS

| | | | |
|---|---|---|---|
| 9,660,897 B1 | 5/2017 | Gredler | |
| 9,887,885 B2* | 2/2018 | Varney | .......... G06F 15/173 |
| 2009/0222540 A1* | 9/2009 | Mishra | .......... H04L 41/5054 |
| | | | 709/222 |
| 2010/0174814 A1* | 7/2010 | Busschbach | .......... H04L 69/08 |
| | | | 709/226 |
| 2013/0060945 A1* | 3/2013 | Allam | .......... G06F 9/455 |
| | | | 709/226 |
| 2014/0280966 A1* | 9/2014 | Sapuram | .......... H04L 41/5054 |
| | | | 709/226 |

OTHER PUBLICATIONS

E. Chen et al., "Dynamic Capability for BGP-4", Cisco Systems, Network Working Group—Internet Draft, Dec. 5, 2011, pp. 1-8.
B. Thomas et al., "LDP Capabilities", Cisco Systems, Network Working Group—Internet Draft, Jul. 2009, pp. 1-13.
S. Wadhwa et al., "Protocol for Access Node Control Mechanism in Broadband Networks", Juniper Networks, Network Working Group—Internet Draft, Aug. 24, 2010, pp. 1-66.

\* cited by examiner

*Primary Examiner* — Frantz B Jean
(74) *Attorney, Agent, or Firm* — Merchant & Gould P.C.

(57) ABSTRACT

A method comprising obtaining from a first service-providing device, a plurality of service capability indicators for a set of interconnected devices. The plurality of service capability indicators are indicative of a corresponding plurality of service capabilities according to which the first service-providing device is providing services to one or more nodes. The method further comprises mapping the plurality of service capability indicators to a service capability label according to satisfaction of a continuity criterion. The service capability label corresponds to a representation of the plurality of service capabilities associated with a connection to the first service-providing device. The method further comprises providing the service capability label to the one or more nodes in order to provide the representation of the plurality of service capabilities associated with the connection to the first service-providing device.

20 Claims, 5 Drawing Sheets

MAPPING SERVICE CAPABILITIES

TECHNICAL FIELD

The present disclosure relates generally to networking, and in particular, mapping service capabilities for nodes.

BACKGROUND

A networking environment often includes a number of networking devices (e.g., switch, router, cloud server, etc.) that provides services to various nodes. A particular networking device has a set of capabilities that affects performance and/or security associated with the provided services. A set of capabilities includes, for example, processing power, bandwidth level, and level of antivirus protection. It is not uncommon for a set of capabilities to change over time. Moreover, it is not uncommon for a particular node to be within respective service areas of numerous networking devices at the same time.

In some current systems, the networking device provides information about the set of capabilities to a node seeking to utilize the services of the networking device. Often, the service capability information is provided at the time the node establishes a connection with the networking device and not thereafter. As a result, any changes to the set of capabilities of the networking device need to be provided to the node manually, such as by an operator of the network. Not only does this manual process burden the network operator, it delays communications to the node concerning changes to the set of capabilities of the networking device. Accordingly, the node has outdated service capability information for long spans of time, hindering the ability of the node to make changes in how to receives services.

BRIEF DESCRIPTIONS OF THE DRAWINGS

For a better understanding of aspects of the various embodiments described herein and to show more clearly how they may be carried into effect, reference is made, by way of example only, to the accompanying drawings.

Figure 1:
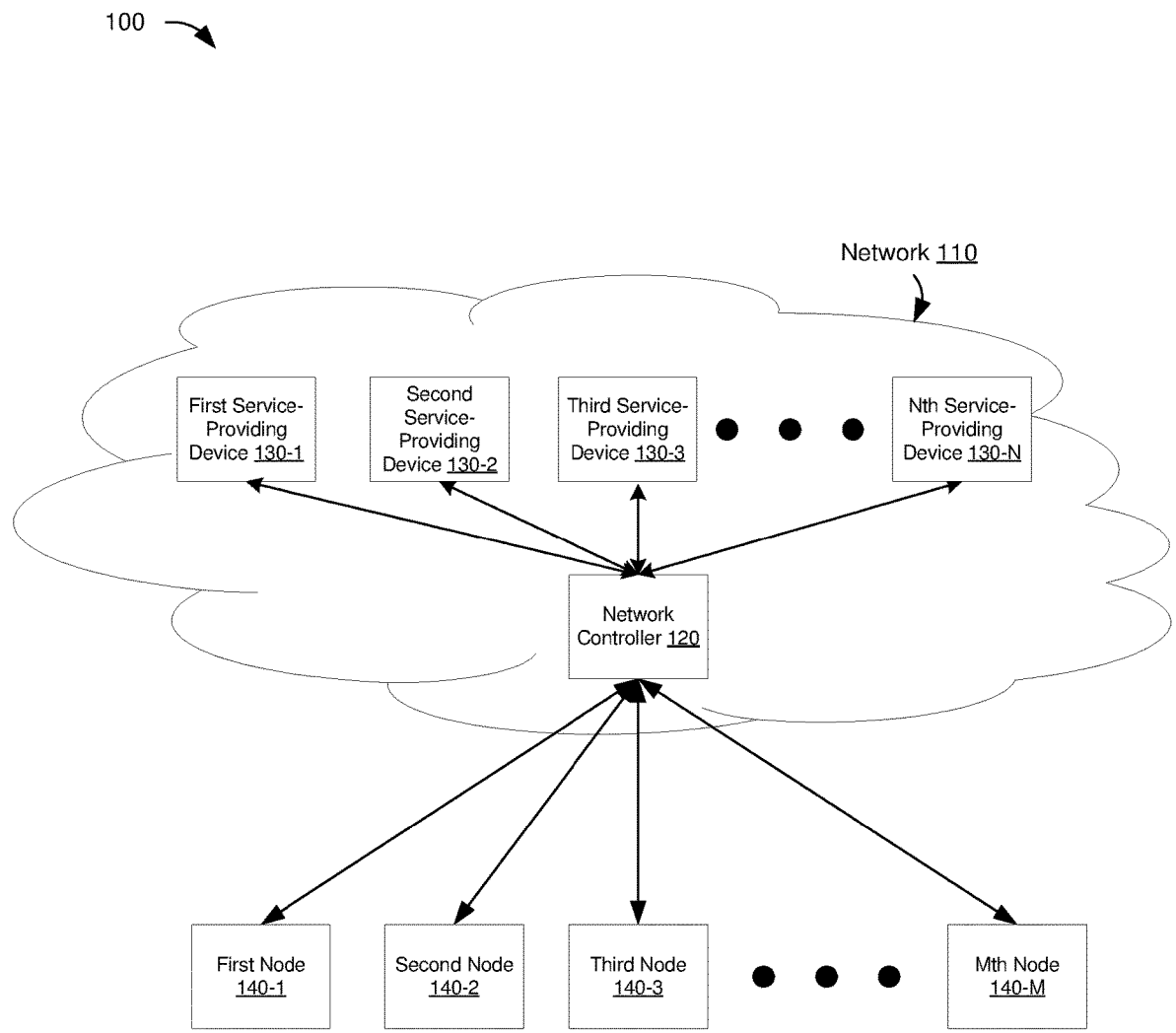
FIG. 1 is a block diagram of an example of a networking environment including mapping service capabilities in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative embodiments shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the embodiments described herein.

Overview

Various embodiments disclosed herein include apparatuses, systems, devices, and methods to enable mapping service capabilities for nodes. The method comprises obtaining from a first service-providing device, a plurality of service capability indicators. The plurality of service capability indicators are indicative of a corresponding plurality of service capabilities according to which the first service-providing device is providing services to one or more nodes. The method further comprises mapping the plurality of service capability indicators to a service capability label according to satisfaction of a continuity criterion. The service capability label corresponds to a representation of the plurality of service capabilities associated with a connection to the first service-providing device. The method further comprises providing the service capability label to the one or more nodes in order to provide the representation of the plurality of service capabilities associated with the connection to the first service-providing device.

In accordance with some embodiments, a network controller includes one or more processors, a non-transitory memory, and one or more programs. The one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a network controller, cause the network controller to perform or cause performance of any of the methods described herein. In accordance with some embodiments, a networking includes: one or more processors, a non-transitory memory, and means for performing or causing performance of any of the methods described herein.

EXAMPLE EMBODIMENTS

Certain current systems provide (e.g., advertise) information about respective sets of capabilities associated with the systems. Commonly, a particular system provides capability information to a node at the time the node establishes or attempts to establish a connection (e.g., during layer two (L2) link establishment process) with the particular system. Subsequently, however, the system does not provide capability information. Accordingly, the system does not provide updated capability information to the node, such as when the system has been updated with new antivirus definitions. Without current capability information, the node is impeded in selecting more desirable services. For example, after the node has established a connection with a first system, the node is unaware that a second system includes better antivirus protection. Thus, the node cannot take advantage of the greater antivirus protection of the second node because the node has no reason to change service providers from the first node to the second node.

By contrast, according to various embodiments, apparatuses, systems, and methods disclose providing (e.g., continuously or near-continuously providing) mapped service capability information to one or more nodes. The mapped service capability information enables the nodes to select whether and how to receive services from certain service-providing device(s). Accordingly, a particular node is able to take advantage of more favorable services capabilities.

FIG. 1 is a block diagram of an example of a networking environment 100 including mapping service capabilities in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 100 includes a network 110, a network controller 120, one or more service-providing devices 130-1-130-N, and one or more nodes 140-1-140-M.

The network 110 may be characterized by any radio access technology (RAT), such as 802-based (e.g., Wi-Fi), 3GPP-defined cellular (e.g., 4G, LTE, 5G, etc.), and/or the like. In some embodiments, the network 110 corresponds to a heterogenous network, including network elements operating in accordance with different RATs. For example, in some embodiments, the network 110 includes both Wi-Fi and cellular network elements, and at least a subset of the one or more nodes 140-1-140-M each includes multiple radios for communicating with both the Wi-Fi and cellular network elements.

The network 110 includes a network controller 120. In some embodiments, the network controller 120 corresponds to any data plane node, such as a router, switch, and/or the like. In some embodiments, the network controller 120 corresponds to a WLAN controller (WLC). In some embodiments, the network controller 120 corresponds to an intent-based system, such as Cisco's digital network architecture (DNA). The network controller 120 maps service capability information obtained from the one or more service-providing devices 130-1-130-N to a service capability label. The network controller 120 provides the service capability label to the one or more nodes 140-1-140-M. In some embodiments, the network controller 120 provides the service capability label continuously (or near continuously) to the one or more nodes 140-1-140-M. Accordingly, the one or more nodes 140-1-140-M are aware of current service capabilities in real-time (or near real-time). Knowledge of the current service capabilities enables the one or more nodes 140-1-140-M to advantageously select how to receive services, including electing to receive services from different service-providing devices 130-1-130-N or to receive different services from the current service-providing devices 130-1-130-N.

The one or more service-providing devices 130-1-130-N provide services to the one or more nodes 140-1-140-M. These services include, but are not limited to, bandwidth, virus protection, processing power, amount of storage, etc. For example, in some embodiments, a service includes an amount of bandwidth currently available to a customer from a cloud service provider that may include many branch locations. In some embodiments, at least a subset of the service-providing devices 130-1 corresponds to any data plane node, such as a router, switch, and/or the like. In some embodiments, at least a subset of the one or more service-providing devices 130-1-130-N provide a representation of aggregated capabilities associated with a cloud. In some embodiments, at least a subset of the one or more service-providing devices 130-1-130-N correspond to edge devices, such as fog nodes. In some embodiments, at least a subset of the one or more service-providing devices 130-1-130-N corresponds to servers, such as a cloud server (e.g., a cloud service provider (CSP)).

The one or more nodes 140-1-140-M may correspond to variety of network devices, and may be part of the same domain and/or same subnet. In some embodiments, at least a subset of the one or more nodes 140-1-140-M correspond to customer devices, such as client devices accessing respective cloud application services. In some embodiments, at least a subset of the one or more nodes 140-1-140-M correspond to Enterprise customer devices. In some embodiments, at least a subset of the one or more nodes 140-1-140-M are part of a second network that is separate from the network 110. Based on the service capability label, a particular node of the one or more nodes 140-1-140-M may choose to accept or reject associated services. For example, the first node 140-1, which is receiving services from the second service-providing device 130-2, obtains a service capability label indicating that the first service-providing device 130-1 includes the latest antivirus definitions. In response, the first node 140-1 elects to change reception of services from the second service-providing device 130-2 to the first service-providing device 130-1 because the second service-providing device 130-2 does not have the latest antivirus definitions.

Figure 2:
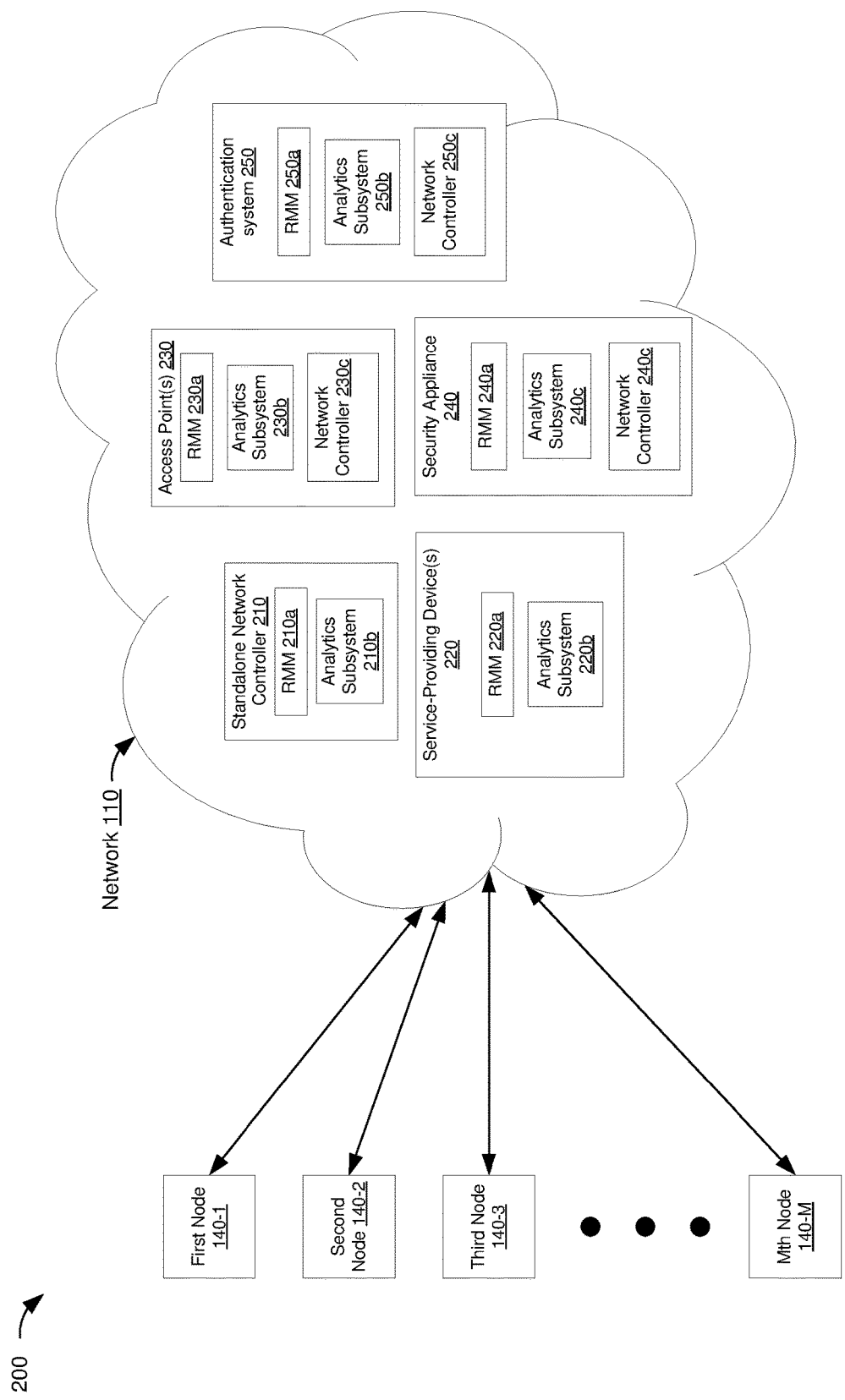
FIG. 2 is a block diagram of an example of a networking environment including distributed mapping of service capabilities in accordance with some embodiments.

FIG. 2 is a block diagram of an example of a networking environment 200 including distributed of mapping service capabilities in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 200 includes the one or more nodes 140-1-140-M and the network 110 including a standalone network controller 210, one or more service-providing device(s) 220, one or more access points 230, a security appliance 240, and an authentication system 250. In some embodiments, the standalone network controller 210 is similar to and adapted from the network controller 120 in FIG. 1. In some embodiments, at least a subset of the access points 230 correspond to 802-based access points (e.g., Wi-Fi access points). In some embodiments, at least a subset of the access points 230 correspond to a cellular (e.g., 4G, 5G, etc.) access point, such as a cellular base station including an eNodeB or a gNodeB. One of ordinary skill in the art will appreciate that the network 110 may include more or fewer networking devices, of the same or different types, as desired by an operator of the network 110.

The service-providing device(s) 220 provide services to the nodes 140-1-140-M. In some embodiments, the service-providing device(s) 220 each include a resource management module (RMM) 220a and/or an analytics subsystem 220b that are configured to provide management of data on each of the nodes 140-1-140-M sharing one or more network resources. For example, in some embodiments, the RMM 220a and/or the analytics subsystem 220b are configured to monitor traffic to and/or from the nodes 140-1-140-M and determine respective resource utilization values that are each representative of how much of a network resource is being utilized by a particular node. In various embodiments, as illustrated in FIG. 2, additional networking devices in the network 110, such as the standalone network controller 210, the access points 230, the security appliance 240, the authentication system 250, or a combination thereof, include respective RMMs and/or analytics subsystems.

In various embodiments, the network 110 further includes a security appliance 240 (e.g., a server) that protects the network 110 from unwanted and/or harmful traffic. For example, the security appliance 240 corresponds to one of a firewall, an antivirus scanning device, a content filtering device, an intrusion detection system, a prevention scanning device (e.g., penetration tester, vulnerability assessment system), or a combination thereof.

In some embodiments, the network 110 further includes the authentication system 250. In some embodiments, the authentication system 250 corresponds to a layer two (L2) authentication server (e.g., AAA/RADIUS server), such as one commonly found in an enterprise deployment.

In various embodiments, the networking environment 200 includes distributed mapping of service capabilities. For example, in some embodiments, portions of the mapping of service capabilities are distributed across two or more of: the standalone network controller 210, one or more network controllers 230c integrated within the corresponding one or more access points 230, network controller 240c integrated within the security appliance 240, or the network controller 250c integrated within the authentication system 250. In some embodiments, components of the network controller 300 in FIG. 3 are distributed across the network components in the network 110.

Figure 3:
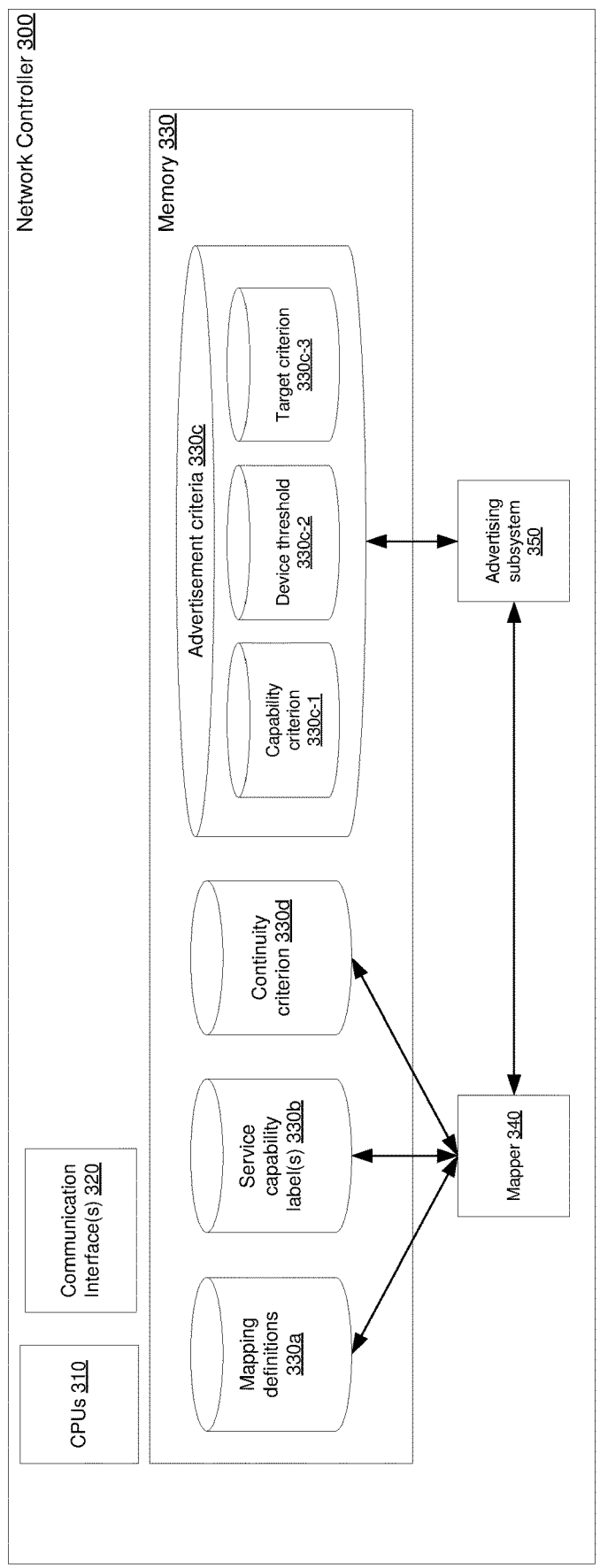
FIG. 3 is a block diagram of a network controller in accordance with some embodiments.

FIG. 3 is a block diagram of a network controller 300 in accordance with some embodiments. In various embodiments, the network controller 300 in FIG. 3 is similar to and adapted from the network controller 120 in FIG. 1. In various embodiments, the network controller 300 in FIG. 3 is similar to and adapted from one or more of the standalone network controller 210, the network controller 230c, the network controller 240c, or the network controller 250c in FIG. 2.

The network controller 300 includes one or more processing units (CPUs) 310. In various embodiments, the one or more CPUs 310 provide processing resources for mapping of service capabilities.

The network controller 300 further includes one or more communication interfaces 320 that provides, for example, an input interface for obtaining service capability indicators from service-providing device(s) and an output interface for providing service capability label(s) to the one or more nodes.

The network controller 300 further includes a memory 330. In various embodiments, the memory 330 corresponds to a non-transitory memory, such as RAM, ROM, etc. In some embodiments, the memory 330 includes a mapping definitions datastore 330a that includes mapping entries between service capability indicators and corresponding service capability label(s). In some embodiments, the memory 330 includes a service capability label(s) datastore 330b in order to store service capability label(s) generated by a mapper 340. In some embodiments, the memory 330 includes a continuity criterion datastore 330d in order to affect the frequency with which the mapper 340 maps service capability indicators to a corresponding service capability label. In some embodiments, the memory 330 includes advertisement criteria 330c, including a capability criterion datastore 330c-1, a device threshold datastore 330c-2, and a target criterion datastore 330c-3. As will be described below, the advertisement criteria 330c affect whether and how service capability label(s) are provided to nodes.

The network controller 300 further includes a mapper 340 to map service capability indicators to service capability label(s). In some embodiments, the mapper maps based on information stored in the mapping definitions datastore 330a. Table 1, below, provides an illustration of an antivirus example of mapping service capability indicators to a corresponding service capability label. One of ordinary skill in the art will appreciate that the mapping entries between indicated service capabilities and service capability labels may correspond to any values. One of ordinary skill in the art will further appreciate that the service capability be any type, such as additional bandwidth, link utilization, application version, etc.

TABLE 1

Mapping definitions between antivirus service capability indicators and antivirus service capability labels

| Indicated Service Capabilities | Mapped Service Capability Label |
| --- | --- |
| None of: latest antivirus definition, latest antivirus application version, and container-based application hosting | "No antivirus protection" |
| One of: latest antivirus definition, latest antivirus application version, and container-based application hosting | "Low antivirus protection" |
| Two of: latest antivirus definition, latest antivirus application version, and container-based application hosting | "Medium antivirus protection" |
| Three of: latest antivirus definition, latest antivirus application version, and container-based application hosting | "High antivirus protection" |

The network controller 300 further includes an advertising subsystem 350 to determine whether and how the network controller 300 provides service capability label(s) to nodes. In some embodiments, the advertising subsystem 350 instructs the network controller 300 to provide a particular service capability label in response to determining that service capability indicators obtained from a first service-providing device (e.g., the first service-providing device 130-1 in FIG. 1) satisfy a capability criterion stored in the capability criterion datastore 330c-1. For example, with reference to Table 1, above, the mapped service capability labels having respective values of high antivirus protection and medium antivirus protection satisfy the capability criterion, while the mapped service capability labels having respective values of low antivirus protection and no antivirus protection does not satisfy the capability criterion. Accordingly, the high and medium antivirus protection service capability labels are provided to nodes, while the low and no antivirus protection service capability labels are not provided to the nodes. In some embodiments, the advertising subsystem 350 instructs the network controller 300 to provide a particular service capability label in response to determining that the number of service-providing devices that satisfy the capability criterion satisfy a device threshold stored in the device threshold datastore 330c-2.

In some embodiments, the advertising subsystem 350 instructs the network controller 300 based on a target criterion stored in the target criterion datastore 330c-3. For example, in some embodiments, the advertising subsystem 350 instructs the network controller 300 to provide a particular service capability label to interested and/or connected nodes. As an example, a service capability label indicating relatively high bandwidth capabilities is provided to nodes that historically or predicatively consume a relatively high amount of bandwidth. In some embodiments, a service capability label is provided to nodes having a certain customer-profile. For example, in some embodiments, service capability labels concerning a particular service legal agreement (SLA) metric (e.g., each node may consume up to 30 Mbps of bandwidth) are provided to nodes that received services according to the SLA metric.

Figure 4:
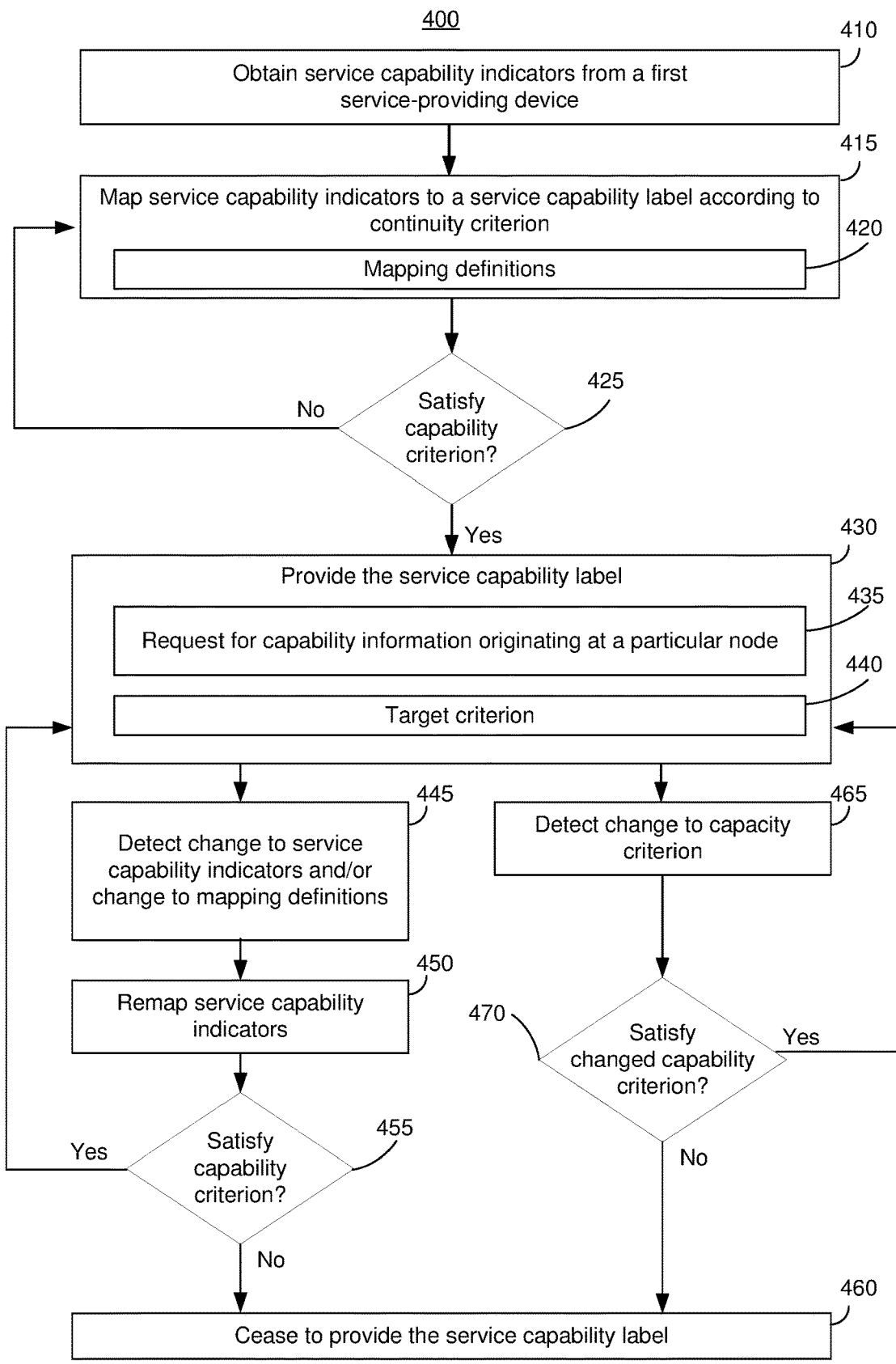
FIG. 4 is a flowchart representation of a method of mapping service capabilities in accordance with some embodiments.

FIG. 4 is a flowchart representation of a method 400 of mapping service capabilities in accordance with some embodiments. In various embodiments, the method 400 is performed by a network controller, such as the network controller 120 in FIG. 1. In various embodiments, the method 400 is performed by a distributed network controller, such as a combination of the standalone network controller 210, the network controller 230c, the network controller 240c, and/or the network controller 250c in FIG. 2. Briefly, the method 400 includes mapping service capability indicators from a service-providing device and providing a mapped service capability label to one or more nodes.

To that end, as represented by block 410, the method 400 includes obtaining, from a first service-providing device, a plurality of service capability indicators indicative of a corresponding plurality of service capabilities according to which the first service-providing device is providing services to one or more nodes. For example, with reference to FIG. 1, the network controller 120 obtains a plurality of service capability indicators from the first service-providing device 130-1.

As represented by block 415, the method 400 includes mapping the plurality of service capability indicators to a service capability label according to satisfaction of a continuity criterion. In some embodiments, the continuity criterion is satisfied when the mapping is continuous (e.g., near-continuous).

The service capability label corresponds to a representation of the plurality of service capabilities associated with a connection to the first service-providing device. For example, with reference to Table 1, above, assuming the service capability indicators indicate that the first service-providing device includes the latest antivirus definitions, the latest antivirus application version, but not container-based application hosting, the capability indicators indicate are mapped to a service capability label having a value of "Medium antivirus protection."

In some embodiments, as represented by block 420, mapping the plurality of service capability indicators to the service capability label is according to mapping definitions. For example, with reference to FIG. 3, the network controller 300 includes the mapper 340 that utilizes the mapping definitions datastore 330a in order to map the plurality of service capability indicators to the service capability label. Continuing with the example, in some embodiments, the network controller 300 stores the service capability label in the service capability label(s) datastore 330b.

In some embodiments, as represented by block 425, the method 400 includes determining whether or not the service capability label satisfies a capability criterion. In some embodiments, the method 400 includes providing the service capability label to the one or more nodes in response to determining that the service capability label satisfies the capability criterion, as indicated by the portion of the method 400 represented by block 430. In some embodiments, in response to determining that the service capability label does not satisfy the capability criterion, the method 400 includes reverting back to mapping the plurality of service capability indicators, as indicated by the portion of the method 400 represented by block 415. For example, with reference to Table 1, above, the capability criterion is satisfied for service capability labels having values of "High Antitrust Protection" or "High Antitrust Protection." Accordingly, service capability labels having values of "High Antitrust Protection" or "High Antitrust Protection" are provided to the one or more nodes, whereas service capability labels having values of "Low Antitrust Protection" or "No Antitrust Protection" are not provided to the one or more nodes.

As represented by block 430, the method 400 includes providing the service capability label to the one or more nodes in order to provide the representation of the plurality of service capabilities associated with the connection to the first service-providing device. In some embodiments, providing the service capability label to the one or more nodes is in real-time (e.g., near real-time), based on satisfaction of the continuity criterion with respect to mapping, as indicated by the portion of the method 400 represented by block 415.

In some embodiments, as represented by block 435, the method 400 includes providing the service capability label to the one or more nodes in response to obtaining, from the first service-providing device, a request for service capability information that originated at a particular one of the one or more nodes. For example, with reference to FIG. 2, the standalone controller 210 obtains, from a particular service-providing device 220, a request for service capability information associated with the particular service-providing device 220, wherein the request originated at the second node 140-2. Continuing with the example, in response to obtaining the request, the controller 240c integrated within the security appliance 240 generates a mapped service capability label concerning the request service capability information and provides the mapped service capability label to the second node 140-2. One of ordinary skill in the art will appreciate that the various functions included within the method 400 may be performed by any combination of the components of the distributed network controller in FIG. 2.

In some embodiments, as represented by block 440, the method 400 includes obtaining, from the first service-providing device, an indication of a subset of the one or more nodes that satisfies a target criterion, and providing the service capability label to the subset of the one or more nodes. For example, with reference to FIG. 1, the network controller 120 obtains, from the third service-providing device 130-3, an indication that the first node 140-1 and the third node 140-3 satisfy a target criterion related to available bandwidth because the first node 140-1 and the third node 140-3 have exhibited a history of consuming relatively large amounts of bandwidth. Accordingly, continuing with the example, the network controller 120 provides service capability label(s) related to available bandwidth to the first node 140-1 and the third node 140-3, and not to the second node 140-2. The target criterion may be related to any number of service capabilities, such as antivirus protection, cloud coverage, service provider (e.g., ISP), historical and/or predictive extent of usage of a particular service by a node, etc.

In some embodiments, as represented by block 445, the method 400 includes detecting a change from the plurality of service capability indicators to a changed plurality of service capability indicators and/or a change to new mapping definitions. For example, with reference to FIG. 1 and Table 1, above, the latest antivirus definitions and application version are installed on the second service-providing device 130-2, but not container-based application hosting. Therefore, the network controller 120 obtains changed plurality of service capability indicators indicating that the second service-providing device 130-2 includes the latest antivirus definitions and application version capabilities. As another example, with respect to changed mapping definitions, the entries in Table 1 are changed such that having any of the three capabilities on a service-providing device corresponds to "antivirus protection," whereas an absence of all three capabilities corresponds to "No antivirus protection."

In response to detecting the change, in some embodiments, the method 400 includes remapping the plurality of service capability indicators to a remapped service capability label according to the changed mapping definitions, as represented by block 450. Continuing with the previous example concerning changed service capability indicators, the service capability label associated with the second service-providing device 130-2 is remapped from "No antivirus protection" (pre-installation) to "Medium antivirus protection" (post-installation).

In some embodiments, as represented by block 455, in accordance with a determination that the remapped service capability label satisfies the capability criterion, the method 400 includes providing the mapped service capability label to the one or more nodes, as indicated by the portion of the method 400 represented by block 430. On the other hand, in some embodiments, in accordance with a determination that the remapped service capability label does not satisfy the capability criterion, the method 400 includes foregoing providing the mapped service capability label to the one or more nodes, as indicated by the portion of the method 400 represented by block 460. In some embodiments, foregoing providing the mapped service capability label to the one or more nodes includes withdrawing the mapped service capability label to the one or more nodes.

In some embodiments, as represented by block 465, the method 400 includes detecting a change from the capability criterion to a changed capability criterion. For example, with reference to Table 1, above, the capability criterion changes such that, rather than the "High antivirus Protection" and "Medium Antitrust Protection" labels satisfying the capability criterion, only the "High antivirus Protection" label satisfies the changed capability criterion.

In some embodiments, as represented by block 470, in accordance with a determination that the service capability label satisfies the changed capability criterion, the method 400 includes continuing to provide the service capability label to the one or more nodes, as indicated by the portion of the method 400 represented by block 430. On the other hand, in some embodiments, in accordance with a determination that the service capability label does not satisfy the changed capability criterion, the method 400 includes ceasing to provide the service capability label to the one or more nodes, as indicated by the portion of the method 400 represented by block 460. In some embodiments, ceasing to provide the service capability label to the one or more nodes includes withdrawing providing the service capability label to the one or more nodes.

Although not depicted in FIG. 4, in some embodiments, the method 400 includes obtaining, from a respective plurality of service-providing devices, a corresponding plurality of service capability indicators, and mapping the respective plurality of service capability indicators to a corresponding plurality of service capability labels. Moreover, in some embodiments, the method 400 includes: detecting a subset of the corresponding plurality of service capability labels that satisfies a capability criterion; determining whether the subset of the corresponding plurality of service capability labels satisfies a device threshold; and in response to determining that subset of the corresponding plurality of service capability labels satisfies the device threshold, providing the subset of the corresponding plurality of service capability labels to the one or more nodes. In some embodiments, the device threshold is satisfied if a sufficient number of total devices in the have a particular service capability label that satisfies the capability criterion. In some embodiments, the device threshold is satisfied if a sufficient percentage of total devices in the have a particular service capability label that satisfies the capability criterion, such as, with reference to Table 1, above, at least half of the service-providing devices have "Medium antivirus Protection" or higher.

As one example, as illustrated in FIG. 3, the network controller 300 includes the device threshold datastore 330c-2. As one example, with reference to FIG. 1 and Table 1, above, the network controller 120 obtains and maps: a first plurality of service capability indicators from the first service-providing device 130-1, a second plurality of service capability indicators from the second service-providing device 130-2, and a third plurality of service capability indicators from the third service-providing device 130-3. Continuing with the example, the network controller 120 determines that the first service capability label indicates that the first service-providing device 130-1 has an available bandwidth of 10 Mbps; the second service capability label indicates that the second service-providing device 130-2 has an available bandwidth of 30 Mbps; and the third service capability label indicates that the third service-providing device 130-3 has an available bandwidth of 1 Mbps. Assuming a capability criterion of 5 Mbps or greater and a device threshold of 50% of greater, the first service capability label and the third service capability label are provided to the one or more nodes because two-thirds of the service capability labels (>50%) satisfy the capability criterion (10 Mbps and 30 Mbps both greater than 5 Mbps). On the other hand, assuming the capability criterion of 5 Mbps or greater and a device threshold of three or more service capability labels, none of the first, second, or third service capability labels are provided to the one or more nodes because two service capability labels (fewer than three or more) satisfy the capability criterion of 5 Mbps or greater. One of ordinary skill in the art will appreciate that any combination of capability criterion and device threshold may be utilized.

Figure 5:
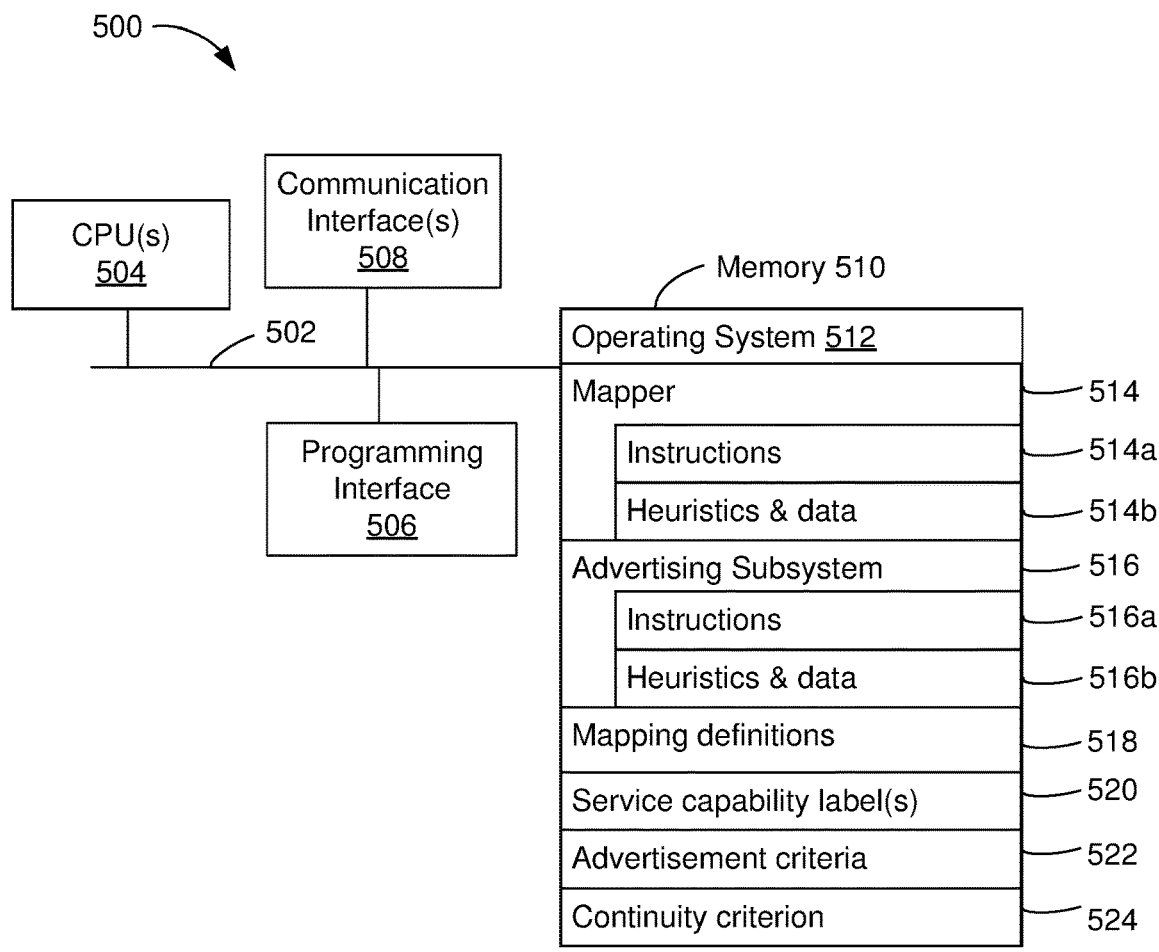
FIG. 5 is a block diagram of a network controller in accordance with some embodiments.

FIG. 5 is a block diagram of a network controller 500 in accordance with some embodiments. In some embodiments, the network controller 500 is similar to and adapted from the network controller 120 in FIG. 1. In some embodiments, the network controller 500 is similar to and adapted from a distributed network controller, such as a combination of the standalone network controller 210, the network controller 230c, the network controller 240c, and/or the network controller 250c in FIG. 2. In some embodiments, the network controller 500 is similar to and adapted from the network controller 300 in FIG. 3. While certain specific features are illustrated, those skilled in the art will appreciate from the present disclosure that various other features have not been illustrated for the sake of brevity, and so as not to obscure more pertinent aspects of the embodiments disclosed herein.

To that end, as a non-limiting example, in some embodiments the network controller 500 includes one or more processing units (CPUs) 504, one or more communication interfaces 508, a memory 510, a programming (I/O) interface 506, and one or more communication buses 502 for interconnecting these and various other components.

In some embodiments, the one or more communication buses 502 include circuitry that interconnects and controls communications between system components. The memory 510 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. The memory 510 optionally includes one or more storage devices remotely located from the one or more CPUs 504. The memory 510 includes a non-transitory computer readable storage medium. In some embodiments, the memory 510 or the non-transitory computer readable storage medium of the memory 510 stores the following programs, modules and data structures, or a subset thereof including an optional operating system 512, a mapper 514, an advertising subsystem 516, mapping definitions 518, service capability label(s) 520, and advertisement criteria 522.

The operating system 512 includes procedures for handling various basic system services and for performing hardware dependent tasks.

In some embodiments, the mapper 514 is configured to obtain, from a first service-providing device, a plurality of service capability indicators indicative of a corresponding plurality of service capabilities according to which the first service-providing device is providing services to one or more nodes. In some embodiments, the mapper 514 is further configured to map the plurality of service capability indicators to a service capability label according to satisfaction of a continuity criterion. The service capability label corresponds to a representation of the plurality of service capabilities associated with a connection to the first service-providing device. In some embodiments, the mapper 514 is further configured to: detect a change from the mapping definitions to changed mapping definitions; and remap the plurality of service capability indicators to a remapped service capability label according to the changed mapping definitions. In some embodiments, the mapper 514 is further configured to: detect a change from the plurality of service capability indicators to a changed plurality of service capability indicators; and map the changed plurality of service capability indicators to a changed service capability label. In some embodiments, the mapper 514 is further configured to: obtain, from a respective plurality of service-providing devices, a corresponding plurality of service capability indicators; and map the respective plurality of service capability indicators to a corresponding plurality of service capability labels. To that end, in some embodiments, the mapper 514 utilizes the mapping definitions 518 and/or the service capability label(s) 520 and includes instructions and/or logic 514a and heuristics and metadata 514b.

In some embodiments, the advertising subsystem 516 is configured to provide the service capability label to the one or more nodes in order to provide the representation of the plurality of service capabilities associated with the connection to the first service-providing device. In some embodiments, the advertising subsystem 516 is further configured to: in accordance with a determination that the remapped service capability label satisfies a capability criterion, provide the remapped service capability label to the one or more nodes; and in accordance with a determination that the remapped service capability label does not satisfy the capability criterion, forego (e.g., withdraw) providing the remapped service capability label to the one or more nodes. In some embodiments, the advertising subsystem 516 is further configured to: in accordance with a determination that the changed service capability label satisfies the capability criterion, provide the changed service capability label to the one or more nodes; and in accordance with a determination that the changed service capability label does not satisfy the capability criterion, forego (e.g., withdraw) providing the service capability label to the one or more nodes. In some embodiments, the advertising subsystem 516 is further configured to: detect a change from the capability criterion to a changed capability criterion; in accordance with a determination that the service capability label satisfies the changed capability criterion, continue to provide the service capability label to the one or more nodes; and in accordance with a determination that the service capability label does not satisfy the changed capability criterion, cease (e.g., withdraw) to provide the service capability label to the one or more nodes. In some embodiments, the advertising subsystem 516 is further configured to: detect a subset of the corresponding plurality of service capability labels that satisfies a capability criterion; determine whether the subset of the corresponding plurality of service capability labels satisfies a device threshold; and in response to determining that subset of the corresponding plurality of service capability labels satisfies the device threshold, provide the subset of the corresponding plurality of service capability labels to the one or more nodes. In some embodiments, the advertising subsystem 516 is further configured to: obtain, from the first service-providing device, a request for service capability information associated with the first service-providing device, wherein the request for the service capability information originated at a particular one of the one or more nodes; wherein providing the service capability label to the particular one of the one or more nodes is in response to obtaining the request for the service capability information. In some embodiments, the advertising subsystem 516 is further configured to: obtain, from the first service-providing device, an indication of a subset of the one or more nodes that satisfies a target criterion; and provide the service capability label to the subset of the one or more nodes. To that end, in some embodiments, the advertising subsystem 516 utilizes the advertisement criteria 522 and includes instructions and/or logic 516a and heuristics and metadata 516b.

Moreover, FIG. 5 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining, from a first service-providing device, a plurality of service capability indicators indicative of a corresponding plurality of service capabilities according to which the first service-providing device is providing services to one or more nodes;
mapping the plurality of service capability indicators to a service capability label according to mapping definitions, wherein the service capability label corresponds to a representation of the plurality of service capabilities associated with a connection to the first service-providing device;
providing the service capability label to the one or more nodes in order to provide the representation of the plurality of service capabilities associated with the connection to the first service-providing device;
detecting a change from the mapping definitions to changed mapping definitions;
remapping the plurality of service capability indicators to a remapped service capability label according to the changed mapping definitions;
determining that the remapped service capability label satisfies a capability criterion;
providing, in response to determining that the remapped service capability label satisfies the capability criterion, the remapped service capability label to the one or more nodes.

2. The method of claim 1, further comprising:
in response to determining that the remapped service capability label does not satisfy the capability criterion, foregoing providing the remapped service capability label to the one or more nodes.

3. The method of claim 1, wherein providing the service capability label to the one or more nodes is in response to determining that the service capability label satisfies the capability criterion.

4. The method of claim 3, further comprising:
detecting a change from the plurality of service capability indicators to a changed plurality of service capability indicators;
mapping the changed plurality of service capability indicators to a changed service capability label;
in response to determining that the changed service capability label satisfies the capability criterion, providing the changed service capability label to the one or more nodes; and
in response to determining that the changed service capability label does not satisfy the capability criterion, foregoing providing the changed service capability label to the one or more nodes.

5. The method of claim 3, further comprising:
detecting a change from the capability criterion to a changed capability criterion;
in response to determining that the service capability label satisfies the changed capability criterion, continuing to provide the service capability label to the one or more nodes; and
in response to determining that the service capability label does not satisfy the changed capability criterion, ceasing to provide the service capability label to the one or more nodes.

6. The method of claim 1, further comprising:
obtaining, from a respective plurality of service-providing devices, a corresponding plurality of service capability indicators; and
mapping the respective plurality of service capability indicators to a corresponding plurality of service capability labels.

7. The method of claim 6, further comprising:
detecting a subset of the corresponding plurality of service capability labels that satisfies a capability criterion;
determining whether the subset of the corresponding plurality of service capability labels satisfies a device threshold; and
in response to determining that subset of the corresponding plurality of service capability labels satisfies the device threshold, providing the subset of the corresponding plurality of service capability labels to the one or more nodes.

8. The method of claim 1, further comprising:
obtaining, from the first service-providing device, an indication of a subset of the one or more nodes that satisfies a target criterion; and
providing the service capability label to the subset of the one or more nodes.

9. The method of claim 1, wherein a continuity criterion is satisfied when mapping the plurality of service capability indicators to the service capability label is continuous.

10. A network controller comprising:
a memory device;
a processing unit connected to the memory device, wherein the processing unit is operative to:
obtain, from a first service-providing device, a plurality of service capability indicators indicative of a corresponding plurality of service capabilities according to which the first service-providing device is providing services to one or more nodes;
map the plurality of service capability indicators to a service capability label according to satisfaction of a continuity criterion, wherein the service capability label corresponds to a representation of the plurality of service capabilities associated with a connection to the first service-providing device;
provide the service capability label to the one or more nodes in response to determining that the service capability label satisfies a capability criterion;
detect a change from the plurality of service capability indicators to a changed plurality of service capability indicators;
map the changed plurality of service capability indicators to a changed service capability label; and
provide, in response to determining that the changed service capability label satisfies the capability criterion, provide the changed service capability label to the one or more nodes.

11. The network controller of claim 10, wherein the processing unit is further configured to:
detect a change from mapping definitions to changed mapping definitions;
remap the plurality of service capability indicators to a remapped service capability label according to the changed mapping definitions;
provide, in response to determining that the remapped service capability label satisfies the capability criterion, provide the remapped service capability label to the one or more nodes; and
provide, in response to determining that the remapped service capability label does not satisfy the capability criterion, forego providing the remapped service capability label to the one or more nodes.

12. The network controller of claim 10, wherein the processing unit is further operative to:
in response to determining that the changed service capability label does not satisfy the capability criterion, forego providing the service capability label to the one or more nodes.

13. The network controller of claim 10, wherein the processing unit is further operative to:
detect a change from the capability criterion to a changed capability criterion;
in response to determining that the service capability label satisfies the changed capability criterion, continue to provide the service capability label to the one or more nodes; and
in response to determining that the service capability label does not satisfy the changed capability criterion, cease to provide the service capability label to the one or more nodes.

14. The network controller of claim 10, wherein the processing unit is further operative to:
obtain, from a respective plurality of service-providing devices, a corresponding plurality of service capability indicators; and
map the respective plurality of service capability indicators to a corresponding plurality of service capability labels.

15. The network controller of claim 14, wherein the processing unit is further operative to:
detect a subset of the corresponding plurality of service capability labels that satisfies the capability criterion;
determine whether the subset of the corresponding plurality of service capability labels satisfies a device threshold; and
in response to determining that subset of the corresponding plurality of service capability labels satisfies the device threshold, provide the subset of the corresponding plurality of service capability labels to the one or more nodes.

16. The network controller of claim 10, wherein the processing unit is further operative to:
obtain, from the first service-providing device, a request for service capability information associated with the first service-providing device, wherein the request for the service capability information originated at a particular one of the one or more nodes;
wherein providing the service capability label to the particular one of the one or more nodes is in response to obtaining the request for the service capability information.

17. The network controller of claim 10, wherein the processing unit is further operative to:
obtain, from the first service-providing device, an indication of a subset of the one or more nodes that satisfies a target criterion; and
provide the service capability label to the subset of the one or more nodes.

18. A non-transitory computer readable medium storing instructions, which, when executed by one or more processors of a network controller, cause the network controller to:
obtain, from a first service-providing device, a plurality of service capability indicators indicative of a corresponding plurality of service capabilities according to which the first service-providing device is providing services to one or more nodes;
map the plurality of service capability indicators to a service capability label according to satisfaction of a continuity criterion, wherein the service capability label corresponds to a representation of the plurality of service capabilities associated with a connection to the first service-providing device;
provide the service capability label to the one or more nodes in response to determining that the service capability label satisfies a capability criterion;
detect a change from the plurality of service capability indicators to a changed plurality of service capability indicators;
map the changed plurality of service capability indicators to a changed service capability label; and
provide, in response to determining that the changed service capability label satisfies the capability criterion, provide the changed service capability label to the one or more nodes.

19. The non-transitory computer readable medium of claim 18, wherein the instructions, which, when executed by the one or more processors of a network controller, further cause the network controller to:
obtain, from a respective plurality of service-providing devices, a corresponding plurality of service capability indicators; and map the respective plurality of service capability indicators to a corresponding plurality of service capability labels.

20. The non-transitory computer readable medium of claim 18, wherein the instructions, which, when executed by the one or more processors of a network controller, further cause the network controller to:
- detect a subset of the corresponding plurality of service capability labels that satisfies the capability criterion;
- determine that the subset of the corresponding plurality of service capability labels satisfies a device threshold; and
- provide, in response to determining that subset of the corresponding plurality of service capability labels satisfies the device threshold, the subset of the corresponding plurality of service capability labels to the one or more nodes.

* * * * *